United States Patent
Spaulding et al.

(10) Patent No.: US 9,791,013 B2
(45) Date of Patent: Oct. 17, 2017

(54) ANTI-TILT FEATURE FOR TORSION SPRING FOR DEFAULT-TO-PARK LEVER

(71) Applicant: FORD GLOBAL TECHNOLOGIES, LLC, Dearborn, MI (US)

(72) Inventors: Todd C. Spaulding, Ann Arbor, MI (US); Susan M. Wyatt, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 96 days.

(21) Appl. No.: 14/938,178

(22) Filed: Nov. 11, 2015

(65) Prior Publication Data

US 2017/0130794 A1    May 11, 2017

(51) Int. Cl.
 *F16F 1/12*   (2006.01)
 *B60T 7/10*   (2006.01)
 *F16H 63/34*  (2006.01)

(52) U.S. Cl.
CPC .............. *F16F 1/123* (2013.01); *B60T 7/104* (2013.01); *F16H 63/3433* (2013.01)

(58) Field of Classification Search
None
See application file for complete search history.

(56) References Cited

U.S. PATENT DOCUMENTS

| 2,860,731 | A | * | 11/1958 | Hause | ..................... | B60T 1/005 |
| | | | | | | 188/69 |
| 4,726,572 | A | | 2/1988 | Flesher et al. | | |
| 4,800,774 | A | | 1/1989 | Hagiwara et al. | | |
| 2011/0168519 | A1 | * | 7/2011 | Stauber | ............... | F16H 63/3433 |
| | | | | | | 192/219.5 |
| 2015/0308571 | A1 | | 10/2015 | Wyatt et al. | | |

FOREIGN PATENT DOCUMENTS

| CN | 201310592 Y | 9/2009 |
| CN | 202732812 U | 2/2013 |
| CN | 203756829 U | 8/2014 |
| CN | 203756830 U | 8/2014 |
| CN | 204299336 U | 4/2015 |

* cited by examiner

*Primary Examiner* — Jacob S Scott
*Assistant Examiner* — Timothy M Hannon
(74) *Attorney, Agent, or Firm* — James Dottavio; MacMillan, Sobanski & Todd, LLC

(57) ABSTRACT

In a default-to-park system for a transmission, a lever member has a cylindrical hub configured to rotate about a spindle. The lever member has a transverse plate including a lever arm connected to a park release actuator and to a link to a park pawl of the transmission. Under normal operation, a transmission controller shifts the actuator to turn the lever arm and release the park pawl so the transmission can rotate. In an absence of a signal from the controller to the actuator, a bias spring restores the lever arm so that the transmission is locked. The bias spring comprises torsion coils disposed over the hub, a fixed end, and a drive end. The drive end has a heel segment bearing against a transverse surface of the transverse plate facing the torsion coils and a loading hook wrapped around an edge of the transverse plate.

5 Claims, 5 Drawing Sheets

ANTI-TILT FEATURE FOR TORSION SPRING FOR DEFAULT-TO-PARK LEVER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a shift-by-wire transmission, and, more specifically, to a bias spring operable in a default-to-park mechanism.

In a shift-by-wire transmission arrangement, the traditional mechanical connection between a transmission gear selector and the transmission is eliminated. Instead, a transmission control device transmits an electrical signal to an electronic controller which directs separate actuators to apply or release the various friction elements of the transmission to obtain a desired gear ratio. The control device is no longer necessarily in the form of a lever because the control device is no longer moving a mechanical connection for controlling the transmission. Instead, the control device is typically an electro-mechanical interface (e.g., a series of buttons, lever, or knob) that is used to instruct the transmission to switch between the transmission ranges.

In order to ensure that a vehicle enters an immobile state when a shift-by-wire system enters a Park state, a failsafe system may be implemented known as a default-to-park system. In some embodiments, the transmission may be provided with a park pawl operated by an actuator in order to selectably engage with at least one gear in the transmission to inhibit vehicle motion or to release from the at least one gear to permit vehicle motion. The park pawl may be engaged in response to a driver shifting the transmission gear selector to PARK.

The actuator for a default-to-park system may be a hydraulic actuator (i.e., valve), for example. Under normal vehicle operation, an engine drives a transmission pump to supply hydraulic pressure to the actuator and enable application or release of the park pawl. When the engine is turned off or in the event of certain component failures, the hydraulic pressure is lost. A return element such as a bias spring is used to automatically return the park pawl into engagement with the transmission to act as a transmission brake or lock so that vehicle movement is halted by default under those conditions.

The bias spring is typically comprised of a torsion spring, as shown in U.S. Patent Application Publication US2015/0308571, published Oct. 29, 2015, entitled "Parking Override Device for a Shift-By-Wire Transmission," which is incorporated herein by reference in its entirety. Torsion springs are used in many applications where package space or other considerations may preclude the use of an extension or compression spring. One potential problem with torsion springs in the known configurations is the tendency for the ends where the spring is anchored (to either a stationary or a moving component) to "tilt" as the spring is loaded (i.e., wound-up) by motion of the components. If great enough, this tilt can cause the spring end to become disconnected from the component it is intended to remain in contact with. This tendency to tilt is usually countered by increasing the wire diameter of the spring itself. However, increasing the wire diameter has the effect of increasing the rate of the spring, so that as the spring is deflected the spring force rapidly increases. This increase in force from the spring is often undesirable. The desired state for the spring as used in the default-to-park mechanism is to provide an initial loading force (i.e., an "installed force") when the components are in their resting state (to keep the park pawl engaged), with the force increasing as little as possible as the spring is deflected during operation of the components so that the capacity (and cost) of the actuator can be kept low.

SUMMARY OF THE INVENTION

The present invention provides a torsion spring configuration that prevents twisting because of a counterbalancing of the twisting force due to a special shaping of the attachment of one end of the spring to a lever member in the default-to-park system. Thus, the invention allows the use of a spring with a smaller wire diameter, and consequently a lower spring rate. Besides enabling the use of a lighter and less expensive spring, the power of the actuator needed to overcome the spring force is reduced.

In one aspect of the invention, a default-to-park system for a transmission comprises a lever member having a cylindrical hub configured to rotate about a spindle. The lever member has a transverse plate including a lever arm engageable with a park release actuator and has a receiver engageable with a link to a park pawl of a transmission brake. A bias spring comprises torsion coils disposed over the hub, a fixed end, and a drive end. The drive end has a heel segment bearing against a transverse surface of the transverse plate facing the torsion coils and a loading hook wrapped around an edge of the transverse plate.

DETAILED DESCRIPTION OF PREFERRED EMBODIMENTS

Figure 1:
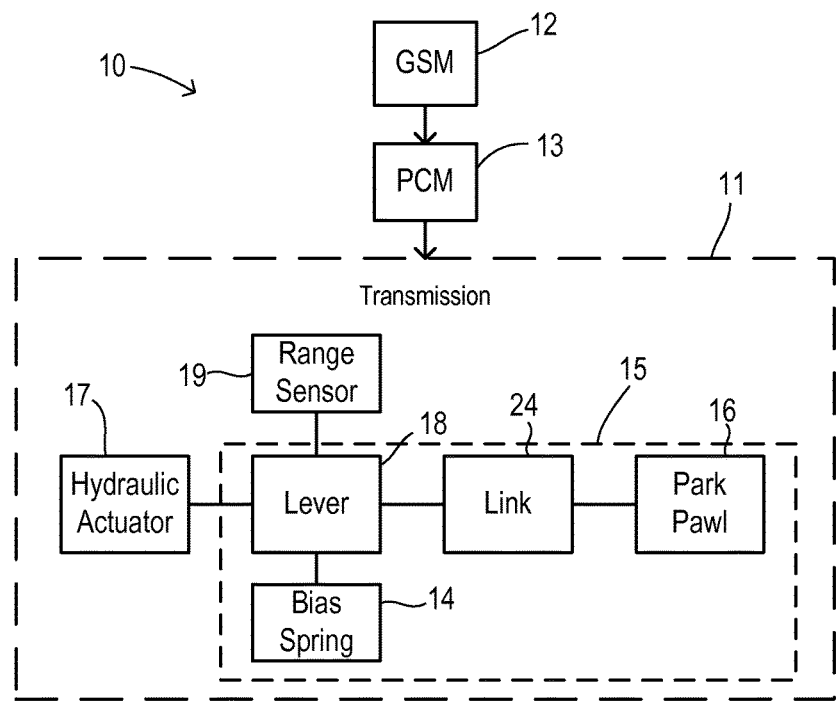
FIG. 1 is a block diagram of one typical example of a shift-by-wire system for incorporating the invention.

Referring to FIG. 1, a shift-by-wire system 10 for an automatic transmission 11 includes a gear shift module (GSM) 12 converting a manually set position of a shift control element into an electrical signal and a powertrain control module (PCM) 13. Automatic transmission 11 further includes a hydraulic actuator 17 and a range sensor 19. A default-to-park system 15 includes a park pawl 16, a lever mechanism 18 (driven by actuator 17), a link 24, and a bias spring 14.

GSM 12 may be located in the passenger compartment of a vehicle where it is operated manually by the vehicle operator, who selects the desired automatic transmission range by actuating a button or shift lever corresponding to the desired range: Park (P), Reverse (R), Neutral (N), Drive (D) and Low (L). These input commands are translated into signals representing the vehicle operator's requests for the desired transmission gear or range. PCM 13 is the decision maker, managing all of the interlocks for shift-by-wire system 10. Hydraulic actuator 17, part of automatic transmission 11, executes the operator's requests received via PCM 13 to shift automatic transmission 11 to the appropriate gear or range after activating hydraulic actuator 17 so that park pawl 16 first disengages from transmission 11, with resulting transmission range reported by range sensor 19. Modules 12 and 13 communicate over a communication area network (CAN). When the vehicle is parked or a fault occurs for which the vehicle should be made immobile, PCM 13 deactivates hydraulic actuator 17 which returns link 24 and park pawl 16 to the engaged position under the influence of bias spring 14.

Figure 2:
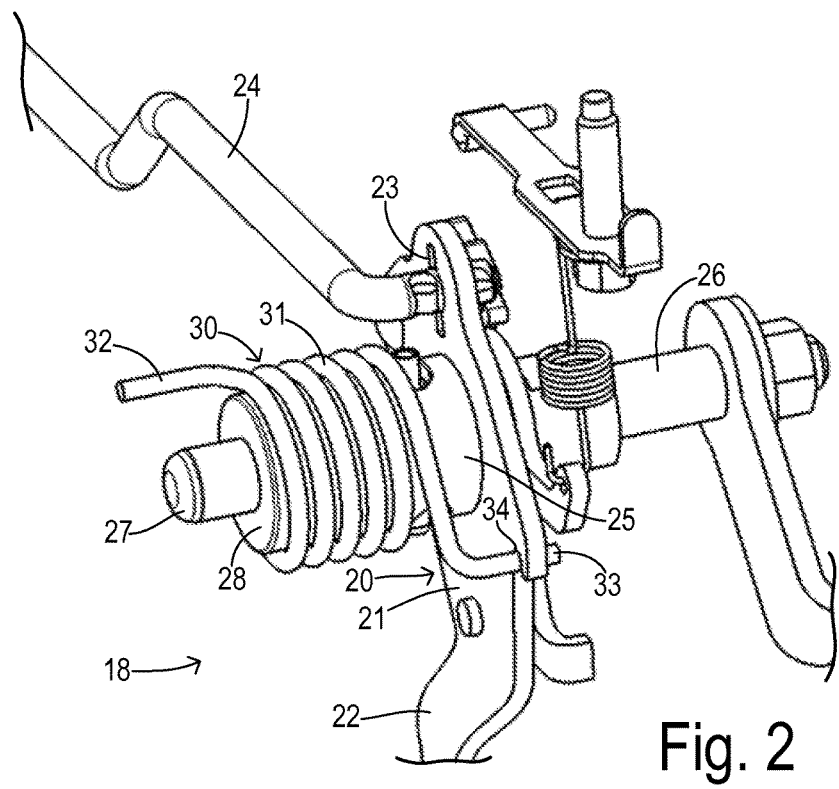
FIG. 2 is a perspective view of a lever mechanism for a default-to-park system using a bias spring.

FIG. 2 shows lever mechanism 18 including a lever member 20 having a transverse lever plate 21 and a cylindrical hub 25 which are configured to rotate about a fixed spindle or shaft 26. Lever plate 21 includes a lever arm 22 engageable with a park release actuator (not shown) and a receiver 23 engaged with a link 24 to the park pawl of the transmission brake. Spindle 26 is mounted transverse to the axial operating direction of the park release actuator and link 24 and has one end 27 adapted to be fixed to a transmission case (not shown). Another hub 28 may be mounted on spindle 26 inside cylindrical hub 25 as part of an override mechanism as described in US patent application publication US2015/0308571A1.

A bias spring 30 mounted over cylindrical hub 25 has torsion coils 31, a fixed end 32, and a drive end 33. Fixed end 32 is captured by an appropriate surface on the transmission case (not shown). Drive end 33 is captured in a slot 34 formed into an edge of lever plate 21. When the park release actuator moves lever arm 22 forward to wind-up bias spring 30, the potential exists for spring 30 to tilt (i.e., rotate about an axis perpendicular to the axis of coils 31), especially at drive end 33. Consequently, drive end 33 could dislodge from slot 34 unless the wire used to form spring 30 is sufficiently rigid to resist the tilt. To obtain the desired stiffness, the wire diameter could be increased which leads to the undesirable results described above.

Figure 3:
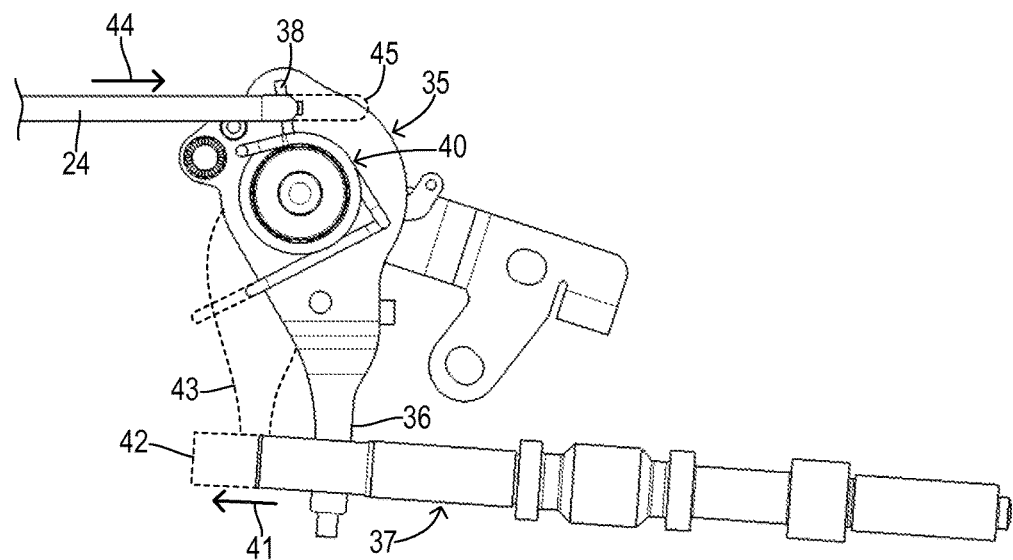
FIG. 3 is a side view of a lever mechanism according to one embodiment of the invention.

The present invention adopts a modified interface between the drive end of the bias spring and the transverse lever plate as shown in FIGS. 3-8. FIG. 3 is a side view looking along the rotational axis of the hub, upon which a bias spring 40 is mounted. A transverse lever plate 35 has a lever arm 36 interfaced with a park release actuator 37. A receiver 38 (e.g., a mounting hole) in lever plate 35 connects to one end of link 24. Solid lines in FIG. 3 show the position of the lever mechanism in its engaged state in which the park pawl prevents movement of the transmission. Upon activation of actuator 37, it moves in the direction of arrow 41 to a position shown by dashed line 42. Transverse lever plate 35 moves to the position shown at dashed line 43, whereby link 24 moves in the direction of arrow 44 to the position shown by the dashed line 45. When actuator 37 is deactivated, bias spring 40 moves the lever mechanism back to the position show in solid lines.

Figure 4:
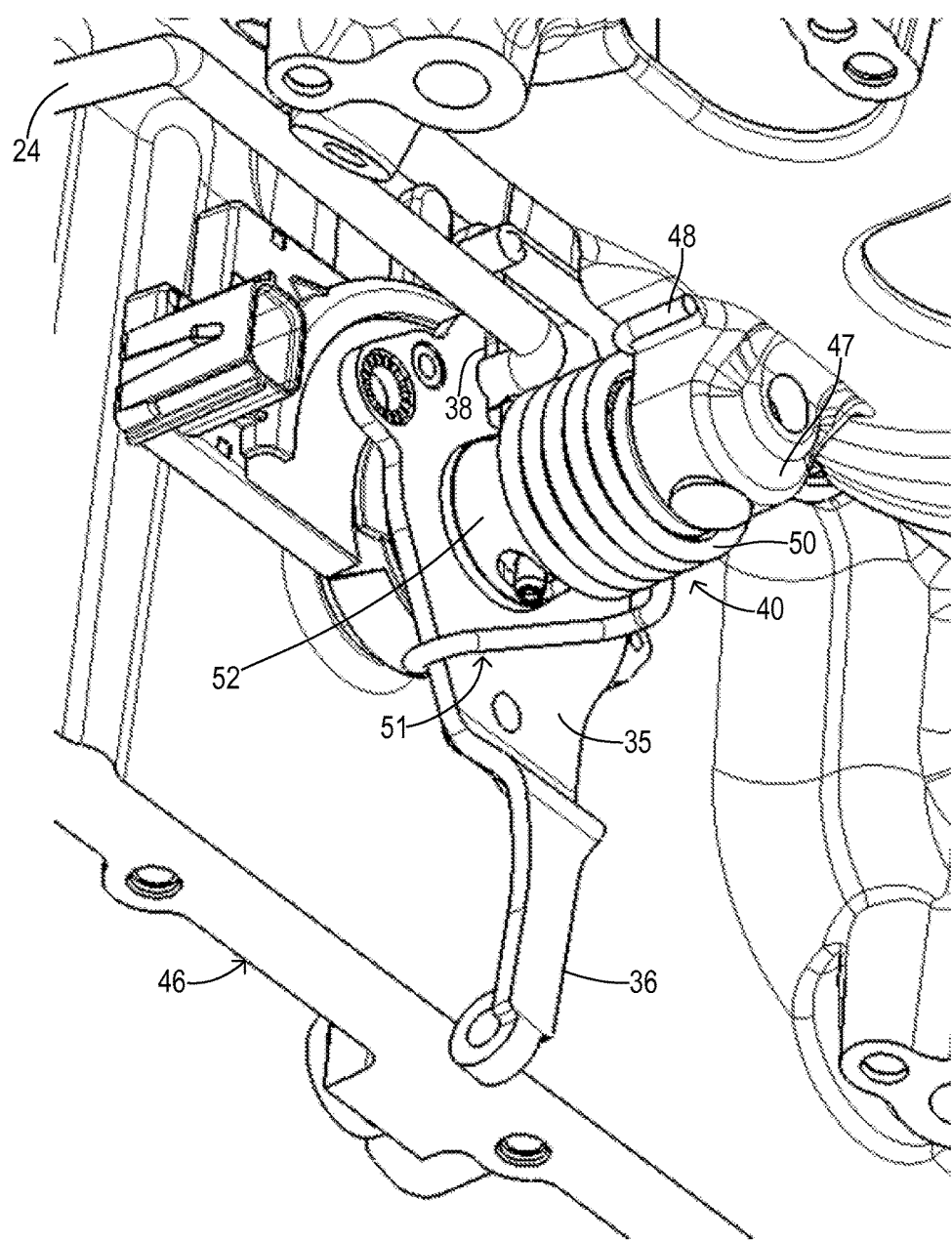
FIG. 4 is a perspective view of the lever mechanism of FIG. 4 installed in a transmission case.

FIG. 4 is a perspective view of the lever mechanism installed in a transmission case 46. The park release actuator is removed for clarity. Case 46 includes a boss 47 for receiving the spindle and for providing a bearing surface for a fixed end 48 of bias spring 40. Spring 40 includes torsion coils 50 disposed over cylindrical hub 52 which is fixedly to lever plate 35. Spring 40 has a drive end 51 which is wound up by movement of lever arm 36 to the left in FIG. 4 and which unwinds upon deactivation of the park release actuator in order to move link 24 to the left so that the transmission becomes locked.

Figure 5:
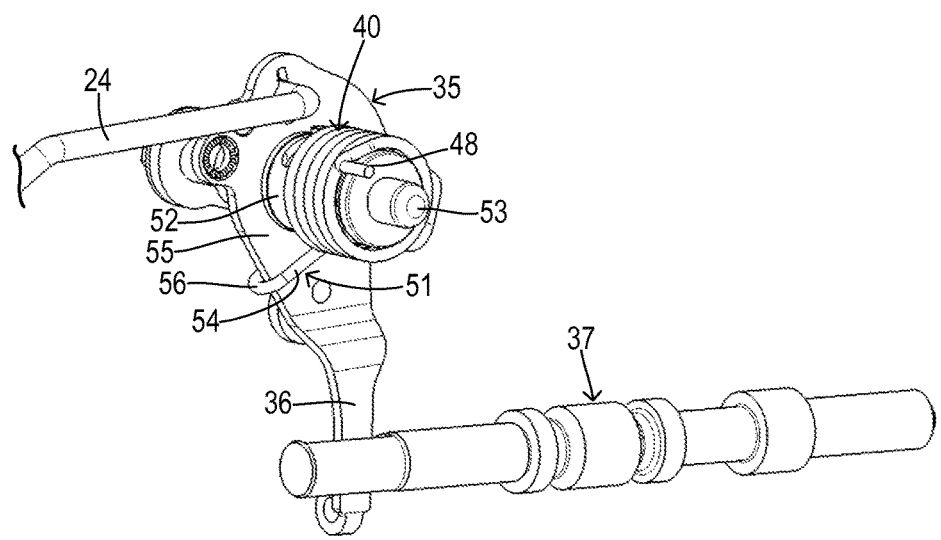
FIGS. 5 and 6 are perspective views of the lever mechanism of FIG. 4.
Figure 6:
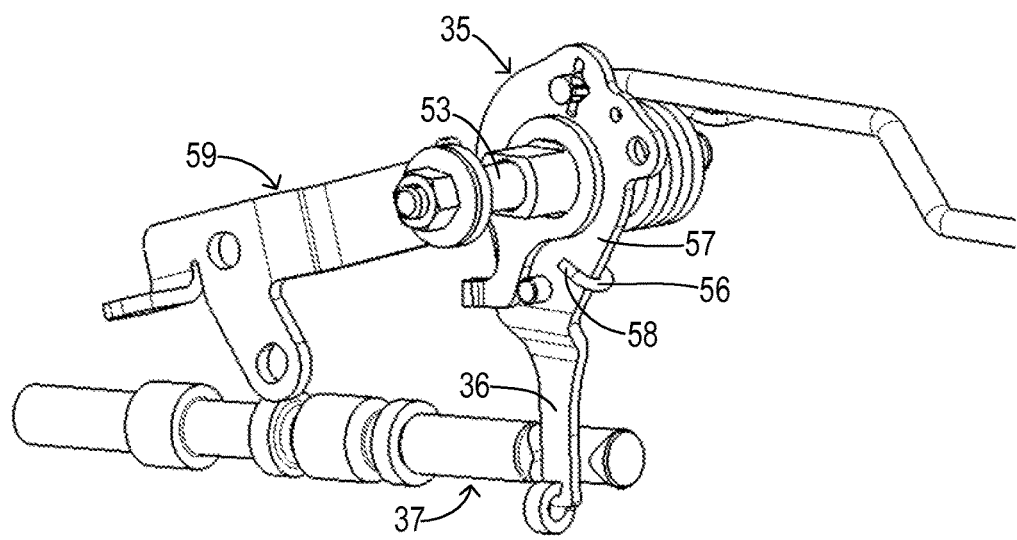

Referring to FIG. 5, drive end 51 of spring 40 includes a heel segment 54 bearing against a transverse plate surface 55 of plate 35 (i.e., the surface that faces coils 50). Drive end 51 further includes a loading hook 56 wrapped around the edge of lever plate 35. As shown in FIG. 6, loading hook 56 includes a wraparound end 58 bearing against a second surface 57 of plate 35. An override mechanism 59 may also be mounted over spindle 53.

Referring again to FIG. 5, the configuration of heel segment 54 and loading hook 56 provide a counterbalance for bias spring 40 that directly resists twisting. Heel segment 54 lies flat against surface 55 for a predetermined length which is sufficient to resist twisting. In addition, friction between heel segment 54 and lever plate 35 limits lateral movement of the drive end of the spring. The wraparound shape of loading hook 56 and end 58 further limit the twisting while ensuring that the direction of load transfer between spring 40 and lever plate 35 is aligned in the plane of rotation of the lever mechanism.

Figure 7:
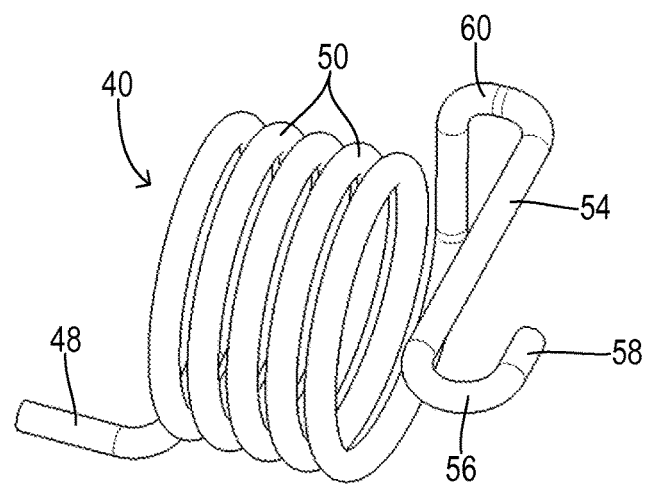
FIG. 7 is a perspective view of the bias spring of FIG. 4.
Figure 8:
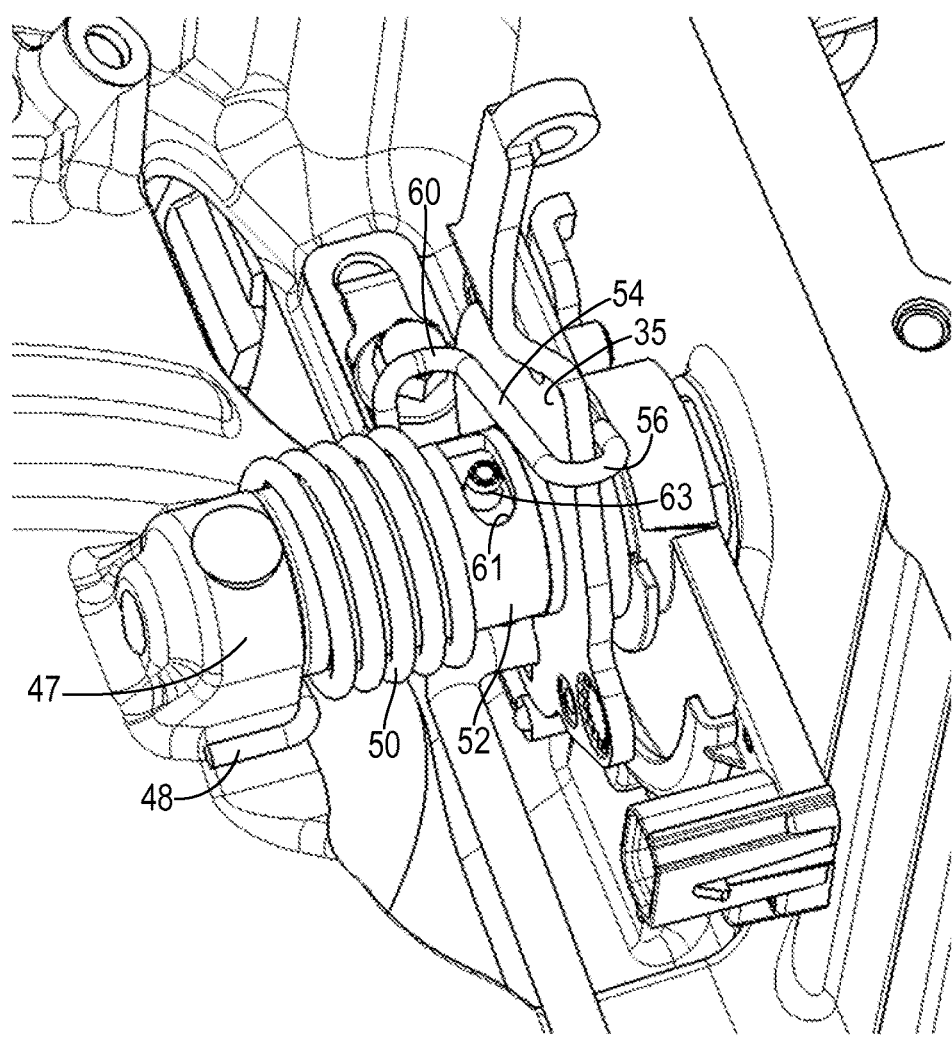
FIG. 8 is another perspective view of the lever mechanism of FIG. 4 installed in the transmission case.

FIG. 7 shows spring 40 in greater detail. Heel segment 54 may be separated from torsion coils 50 by a bridge segment 60 which extends coaxially with respect to the spindle. Bridge segment 60 is provided to accommodate a hub capturing mechanism as shown in FIG. 8. Thus, cylindrical hub 52 includes a guide slot 61 to accommodate a guide pin 63 which is secured to the spindle (or to an internal hub of an override mechanism) upon which hub 52 rotates. Guide pin 63 thus maintains proper alignment for hub 52 and lever plate 35 at a desired location along the spindle. Since guide pin 63 is installed after hub 52 with bias spring 40 have been installed, guide slot 61 must remain accessible (i.e., not be blocked by spring 40). Thus, bridge segment 60 is utilized between the torsion coils and the drive end of spring 40. However, the presence of bridge segment 60 increases the potential for tilting of bias spring 40. Nevertheless, such tendency to tilt is counterbalanced by the action of heel segment 54 and loading hook 56. Consequently, a bias spring of a small diameter wire can be used without any associated risk of detachment of the spring due to twisting. Therefore, a more desirable spring rate can be obtained along with lowering costs and weight for the default-to-park system.

What is claimed is:

1. A default-to-park system for a transmission, comprising:
    a lever member having a cylindrical hub configured to rotate about a spindle and having a transverse plate including a lever arm engageable with a park release actuator and a receiver engageable with a link to a park pawl of a transmission brake; and
    a bias spring comprising torsion coils disposed over the hub, a fixed end, and a drive end, wherein the drive end has a heel segment bearing against a transverse surface of the transverse plate facing the torsion coils and a loading hook wrapped around an edge of the transverse plate.

2. The system of claim 1 wherein the hub includes a guide slot proximate to the transverse plate configured to receive a guide pin projecting from the spindle, and wherein the bias spring includes a bridge segment between the heel segment and the torsion coils so that the guide slot is unobstructed.

3. A default-to-park system for a transmission, comprising:

a transmission brake with a park pawl having an engaged position for locking the transmission and an unengaged position for releasing the transmission;
a link coupled to the park pawl;
an actuator responsive to a controller for generating a force for moving the park pawl to the unengaged position;
a fixed spindle;
a lever member connected to the link and to the actuator, wherein the lever member has a cylindrical hub configured to rotate about the spindle, wherein the lever member has a transverse plate with a lever arm connected to the actuator and a receiver connected to the link; and
a bias spring comprising torsion coils disposed over the hub, a fixed end, and a drive end, wherein the drive end has a heel segment bearing against a transverse surface of the transverse plate facing the torsion coils and a loading hook wrapped around an edge of the transverse plate.

4. The system of claim 3 wherein the hub includes a guide slot proximate to the transverse plate configured to receive a guide pin projecting from the spindle, and wherein the bias spring includes a bridge segment between the heel segment and the torsion coils so that the guide slot is unobstructed.

5. The system of claim 3 wherein the bias spring applies an initial loading force against the link with the park pawl in the engaged position, wherein the actuator winds up the bias spring when moving the park pawl to the unengaged position, and wherein the heel counterbalances a twisting force associated with the wind up.

\* \* \* \* \*